United States Patent
Terriberry et al.

(10) Patent No.: US 10,469,877 B1
(45) Date of Patent: Nov. 5, 2019

(54) SYSTEMS AND METHODS FOR REDUCED COMPLEXITY ENTROPY CODING

(71) Applicant: Mozilla Corporation, Mountain View, CA (US)

(72) Inventors: Timothy B. Terriberry, Mountain View, CA (US); Nathan E. Egge, Alexandria, VA (US)

(73) Assignee: Mozilla Corporation, Mountain View, CA (US)

( * ) Notice: Subject to any disclaimer, the term of this patent is extended or adjusted under 35 U.S.C. 154(b) by 0 days.

(21) Appl. No.: 15/965,401

(22) Filed: Apr. 27, 2018

Related U.S. Application Data (60) Provisional application No. 62/492,006, filed on Apr. 28, 2017.

(51) Int. Cl.
*H04N 19/91* (2014.01)
*H04N 19/66* (2014.01)
*H04N 19/89* (2014.01)

(52) U.S. Cl.
CPC ............. *H04N 19/91* (2014.11); *H04N 19/66* (2014.11); *H04N 19/89* (2014.11)

(58) Field of Classification Search
CPC ......... H04N 19/91; H04N 19/89; H04N 19/66
USPC .................................................. 375/240.12
See application file for complete search history.

(56) References Cited

U.S. PATENT DOCUMENTS

| | | | | |
|---|---|---|---|---|
| 8,913,666 B2* | 12/2014 | Sole Rojals | ......... | H04N 19/176 375/240.18 |
| 2012/0027077 A1* | 2/2012 | Reznik | .................... | H03M 7/40 375/240.2 |
| 2014/0219342 A1* | 8/2014 | Yu | .......................... | H04N 19/50 375/240.12 |
| 2015/0016551 A1* | 1/2015 | Esenlik | ................ | H04N 19/117 375/240.29 |
| 2015/0295590 A1* | 10/2015 | Klejsa | .................... | H03M 7/40 341/107 |

* cited by examiner

*Primary Examiner* — Shan E Elahi
(74) *Attorney, Agent, or Firm* — Dergosits & Noah LLP; Todd A. Noah

(57) ABSTRACT

Content to be encoded may be defined by a sequence of values chosen from a set of possible values. Individual values of the set of possible values may have a probability of occurrence in the sequence of values. The set of possible values may have a total probability value. The content may be encoded based on a reduced complexity entropy coding and an interval. The reduced complexity entropy coding may partition the interval into sub-intervals based the probability of individual values that appears in the sequence of values and a reduced complexity partition function. The reduced complexity partition function may have an interval size value reduced by a reduction value less than the total probability value.

15 Claims, 4 Drawing Sheets

SYSTEMS AND METHODS FOR REDUCED COMPLEXITY ENTROPY CODING

SUMMARY

One aspect of this disclosure relates to encoding content using reduced complexity entropy coding. Content to be encoded may be obtained. The content may be defined by a sequence of values. The values may be chosen from one or more sets of possible values. Individual values of the set of possible values may have a probability of occurrence in the sequence of values. All of the values of the set of possible values may have a total probability value. The content may be encoded based on a reduced complexity entropy coding and an interval. The reduced complexity entropy coding may partition the interval into sub-intervals based the probability of the individual values that appears in the sequence of values and a reduced complexity partition function. The reduced complexity partition function may have an interval size value reduced by a reduction value less than the total probability value.

A system that encodes content may include one or more processors, and/or other components. The processor(s) may be configured by machine-readable instructions. Executing the machine-readable instructions may cause the processor(s) to facilitate encoding content using reduced complexity entropy coding. The machine-readable instructions may include one or more computer program components. The computer program components may include one or more of a content component, an encode component, and/or other computer program components.

The content component may be configured to obtain content to be encoded and/or other information. In some implementations, the content to be encoded may include one or more of an image, a video, and/or other content. Obtaining content to be encoded may include one or more of accessing, acquiring, analyzing, determining, examining, locating, receiving, retrieving, reviewing, and/or otherwise obtaining the content to be encoded. The content may be defined by a sequence of values. The values may be chosen from one or more sets of possible values. Individual values of the set of possible values may have a probability of occurrence in the sequence of values. All of the values of the set of possible values may have a total probability value. The set of possible values may include a first value.

In some implementations, the set of possible values may be arranged in an ordered sequence. The first value may appear first in the ordered sequence. In some implementations, the first value may correspond to a value of zero. In some implementations, the first value may have the highest probability of occurrence.

The encode component may be configured to encode the content based on a reduced complexity entropy coding, an interval, and/or other information. The reduced complexity entropy coding may partition the interval into sub-intervals based the probability of the individual values that appears in the sequence of values and a reduced complexity partition function. The sub-intervals may include a first sub-interval corresponding to the first value. The reduced complexity partition function may have an interval size value reduced by a reduction value less than the total probability value. In some implementations, the reduction value may include a power of two.

The reduced complexity partition function may accumulate an approximation error of the partitioning at the first sub-interval. In some implementations, the approximation error of the partitioning may be accumulated based on an inverse cumulative distribution function. In some implementations, the accumulation of the approximation error of the partitioning at the first sub-interval may simplify a search loop of a decoder.

One aspect of this disclosure relates to decoding encoded content using reduced complexity entropy coding. Encoded content may be obtained. The encoded content may have been encoded from content based on a reduced complexity partition function and an interval. The content may be defined by a sequence of values. The values may be chosen from one or more sets of possible values. Individual values of the set of possible values may have a probability of occurrence in the sequence of values. All of the values of the set of possible values may have a total probability value. The encoded content may be decoded based on the reduced complexity partition function and the interval. The reduced complexity partition function may have an interval size value reduced by a reduction value less than the total probability value. Decoding the encoded content may include partitioning the interval into sub-intervals based on the reduced complexity partition function to identify a given sub-interval corresponding to the content.

A system that decodes encoded content may include one or more processors, and/or other components. The processor(s) may be configured by machine-readable instructions. Executing the machine-readable instructions may cause the processor(s) to facilitate encoding content using reduced complexity entropy coding. The machine-readable instructions may include one or more computer program components. The computer program components may include one or more of an encoded content component, a decode component, and/or other computer program components.

The encoded content component may be configured to obtain encoded content and/or other information. The encoded content may be encoded from content based on a reduced complexity partition function and an interval. The content may be defined by a sequence of values. The values may be chosen from one or more sets of possible values. Individual values of the set of possible values may have a probability of occurrence in the sequence of values. All of the values of the set of possible values may have a total probability value.

The decode content component may be configured to decode the encoded content based on the reduced complexity partition function, the interval, and/or other information. The reduced complexity partition function may have an interval size value reduced by a reduction value less than the total probability value. Decoding the encoded content may include partitioning the interval into sub-intervals based on the reduced complexity partition function to identify a given sub-interval corresponding to the content.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1A:
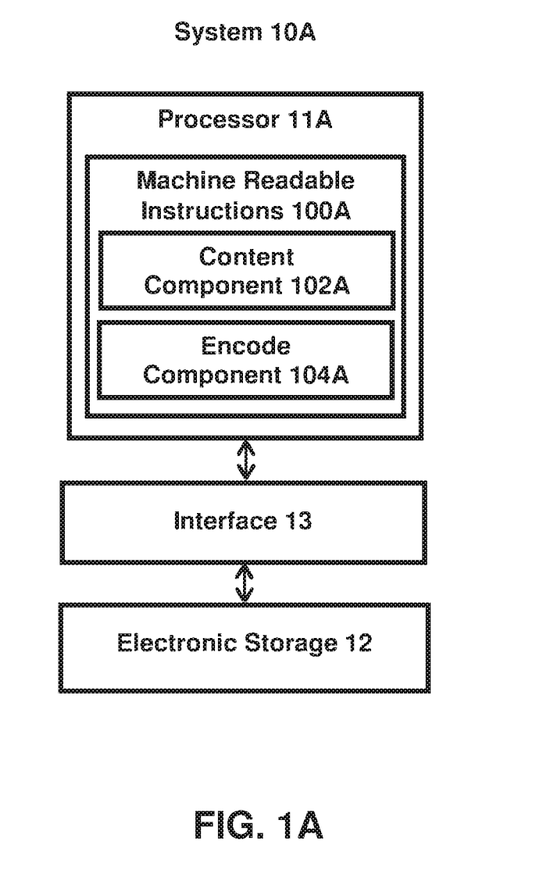
FIG. 1A illustrates an example system that encodes content.

FIG. 1A illustrates a system 10A for encoding content. The system 10A may include one or more of a processor 11A, an electronic storage 12, an interface 13 (e.g., bus, wireless interface), and/or other components. Content to be encoded may be obtained by the processor 11A. The content may be defined by a sequence of values. The values may be chosen from one or more sets of possible values. Individual values of the set of possible values may have a probability of occurrence in the sequence of values. All of the values of the set of possible values may have a total probability value. The content may be encoded based on a reduced complexity entropy coding and an interval. The reduced complexity entropy coding may partition the interval into sub-intervals based the probability of the individual values that appears in the sequence of values and a reduced complexity partition function. The reduced complexity partition function may have an interval size value reduced by a reduction value less than the total probability value. In some implementations, the system 10A may implement/may be implemented via one or more functions.

The electronic storage 12 may be configured to include electronic storage medium that electronically stores information. The electronic storage 12 may store software algorithms, information determined by the processor 11A, information received remotely, and/or other information that enables the system 10A to function properly. For example, the electronic storage 12 may store information relating to content, values, set of possible values, probabilities of occurrence, reduced complexity entropy coding, interval, sub-interval, reduced complexity partition function, approximation error, and/or other information.

Referring to FIG. 1A, the processor 11A may be configured to provide information processing capabilities in the system 10A. As such, the processor 11A may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11A may be configured to execute one or more machine-readable instructions 100A to facilitate encoding content. The machine-readable instructions 100A may include one or more computer program components. The machine-readable instructions 100A may include one or more of a content component 102A, an encode component 104A, and/or other computer program components.

The content component 102A may be configured to obtain content to be encoded and/or other information. In some implementations, the content to be encoded may include one or more of an image, a video, and/or other content. The content to be encoded may be stored as one or more digital file(s). Obtaining content to be encoded may include one or more of accessing, acquiring, analyzing, determining, examining, locating, receiving, retrieving, reviewing, and/or otherwise obtaining the content to be encoded.

The content component 102A may obtain content to be encoded from one or more locations. For example, the content component 102A may obtain the content from a storage location, such as the electronic storage 12, electronic storage of information and/or signals generated by one or more sensors (e.g., image sensors), electronic storage of a device accessible via a network, and/or other locations. The content component 102A may obtain the content from one or more hardware components (e.g., an image sensor) and/or one or more software components (e.g., software running on a computing device).

The content may be defined by one or more sequences of values and/or other information. The values may be chosen from one or more sets of possible values. For example, a sequence of values may include values from different sets of possible values (e.g., chosen from multiple sets of possible possible). A sequence of values may include values from a single set of possible values. Individual values of the set(s) of possible values may have a probability of occurrence in the sequence(s) of values. All of the values of a set of possible values may have a total probability value. A set of possible values may include a first value and/or other values.

In some implementations, the set(s) of values may be arranged in an ordered sequence and the first value may appear first in the ordered sequence. For example, a set of possible values may include an alphabet with one or more elements arranged in an ordered sequence. The elements in the alphabets may be referred to as symbols. The sequence of values defining the content may be referred to as a string over the alphabet. In some implementations, the first value may correspond to a value of zero. In some implementations, the first value may have the highest probability of occurrence. For example, in source coding application, such as audio and video coding, the first value in the alphabet may be the value of zero. The value of zero may have the highest probability of occurrence in the string for source coding application.

A set of possible values may include an alphabet of M possible values. The probability of individual values in the alphabet may be estimated to be p(j), $0 \leq j \leq M$. The cumulative probability of individual values may be represented by:

$$f_l(j) \triangleq \begin{cases} 0, & j = 0 \\ \sum_{j=0}^{j-1} p(k), & 0 < j \leq M \end{cases}$$

The values p(j) may be integers to avoid floating point math. Total probability value may be represented by:

$$f_t \triangleq f_l(M)$$

The mathematical probability of each value of the alphabet may be represented by:

$$\frac{p(j)}{f_t}$$

The probabilities of the values may be calculated based on the sequence of values (e.g., input string) defining the content or based on a historical distribution. For example, the probabilities of the values may be calculated by counting the symbols in the input string. The probabilities of the values may be known based on a frequencies table (e.g., global English frequencies table listing the probabilities that a particular letter will appear in a word).

The encode component 104A may be configured to encode the content based on a reduced complexity entropy coding, an interval, and/or other information. Entropy coding may refer to a type of lossless coding used to compress data and/or other information. Entropy coding may code values given their probabilities of occurrence. The data may be compressed by representing frequently occurring patterns/symbols with smaller amounts of bits and rarely occurring patterns/symbols with larger amounts of bits. For example, entropy coding may detect symbols representing the data at the input and compress the data by replacing symbols with certain variable-length codewords (bits representing coded symbol or string). The length of codewords may be approximately proportional to the negative logarithm of probability of occurrence of the particular symbols, resulting in more common (more probable) symbols being represented by shorter codes.

Entropy coding may maintain an interval [L, L+R) characterized by its lower bound, L, and its size (range), R. To encode a value (of the sequence of values defining content), the interval may be partitioned into sub-intervals of size roughly proportional to the probability of each possible value using a partition function. The lower bound and range may be updated to correspond to the sub-interval of the actual value to be encoded. When all symbols have been encoded, the encoder may generate/output a bit string corresponding to any number, C, in the final interval [L, L+R) (e.g., the one with the shortest binary representation). To decode a value, a decoder may start with the same interval as the encoder, use the same partition function to partition it into sub-intervals, and use the bit string written by the encoder to identify which sub-interval corresponds to the actual value that was encoded (i.e., the sub-interval which contains the number C).

Limiting the size of the range to a fixed number of bits, $b_R$ (e.g., 16, 32) may prevent the need for arbitrary-precision arithmetic, which may be slow and require a large amount of storage. This may limit the number of bits of L that may be affected by partitioning the interval (with the exception of carries). This may limit the number of bits a decoder must examine to determine which sub-interval contains the number written by the encoder. When the value of R becomes too small, or potentially when a value is encoded or decoded, the value of R may be renormalized. The amount of scaling may be chosen based on a maximum that does not cause R to exceed the limit on the number of bits in its representation. L may be similarly scaled, with the top bits being output to a buffer (to eventually become part of C) on the encoder side. Similarly, a decoder may need to examine more bits of C to be able to determine the appropriate sub-interval for the next value to be decoded.

Usage of large number of bits in entropy coding may provide for higher compression accuracy but may lead to higher processing time and power consumption. For example, use of higher bit values in entropy coding may require usage of greater number/more complex hardware (e.g., registers), and operations on these values may include high latency, which may lead to higher power consumption/higher heat generation. Increasing the speed of entropy coding operation may lead to faster processing of information (e.g., faster encoding), lower power consumption, and/or lower heat generation.

A partition function may determine the bounds within an interval to represent particular values/symbols that appears in the input string. The partition function may be a strictly increasing monotonic function, with $f_t$ not larger than the range (R) of the interval. For example, the range (R) may be limited to $b_R$ bits and $f_t$ may be limited to 2 to the power of $b_f$, with $b_f \leq b_R$. One example partition function is given by $$u_{ac}(f) = \left\lfloor \frac{fR}{f_t} \right\rfloor$$

Computing this partition function requires calculation of a product fR, which requires a $b_f \times b_R \rightarrow (b_f + b_R)$-bit multiply. This multiply may require usage of greater number/more complex hardware (e.g., registers) than desired. Moreover, multiplies may have higher latency than addition operations in hardware (e.g., used to update L and R). The division in the partition function may also be too expensive to use in a practical implementation at high data rates.

An example approach to reduce the size of the multiply may be to approximate the result by re-ordering the operations:

$$u_{approx}(f) = \begin{cases} f \left\lfloor \frac{R}{f_t} \right\rfloor, & 0 \leq f < f_t \\ R, & f = f_t \end{cases}.$$

This approximation may reduce the multiply size to $b_f \times (b_R - b_f) \rightarrow b_R$ bits. However, this approximation amplifies the truncation error of the division, which decreases compression accuracy. In short, approximation may lead to there not being enough number of bits to represent the smallest possibilities, resulting in compression error. Moreover, all of the approximation error may be collected into the last possible value, essentially over-estimating p(M−1) and underestimating all of the other probabilities.

The reduced complexity entropy coding may partition the interval into sub-intervals based the probability of the individual values that appears in the sequence of values and a reduced complexity partition function. The sub-intervals may include a first sub-interval corresponding to the first value and/or other sub-intervals. The reduced complexity partition function may reduce one or more interval size values by a reduction value (a value less than the total probability value). Reducing the interval size value(s) by the reduction value may provide a balance of providing faster operation while limiting compression error. Reducing the interval size value(s) by the reduction value may reduce the size of the multiplies in the reduced complexity partition function without too much loss in compression accuracy.

The reduction value may include a power of two. Constraining the reduction value to a power of two may enable the replacement of the division operation in the reduced complexity partition function by a right-shift operation. Compared to the division operation, the right-shift operation may be essentially free in hardware. A representation of the reduced complexity partition function is provided below:

$$u_{small}(f) = \begin{cases} \left\lfloor \dfrac{f\left\lfloor \dfrac{R}{2^g} \right\rfloor}{\left\lfloor \dfrac{f_t}{2^g} \right\rfloor} \right\rfloor, & 0 \le f < f_t \\ R, & f = f_t \end{cases}.$$

The term g may represent an integer chosen such that $0 \le g \le b_f$. In some implementations, $b_R$ may equal 16, $b_f$ may equal 15, and g may equal 8. The use of the reduction value may reduce the size of the multiply to $b_f \times (b_R-g) \to (b_f+b_R-g)$ bits, which is significantly smaller than the full multiply used by $u_{ac}$ partition function. At the same time, the use of the reduction value may not introduce as much approximation error as the multiply used by $u_{approx}$ partition function when $b_f$ is very close to $b_R$.

Moreover, as discussed above, approximating partition function may result in over-estimation of the probability of the last possible in the set of possible values. The loss in compression accuracy may be reduced by over-estimating the probability of the most probable value in the set of possible values. The reduced complexity partition function may accumulate the approximation error of the partitioning at the sub-interval corresponding to the first value in the set of possible values (e.g., the first sub-interval). In source coding application, such as audio and video coding, the first value (value of zero) in the set of possible values may have the highest probability of occurrence in the string. Accumulation of the approximation error in the first value rather than the last value may be implemented by:

$$u_{small-rev}(f) = \begin{cases} 0, & f = 0 \\ R - \left\lfloor \dfrac{(f_t - f)\left\lfloor \dfrac{R}{2^g} \right\rfloor}{\left\lfloor \dfrac{f_t}{2^g} \right\rfloor} \right\rfloor, & 0 < f \le f_t \end{cases}.$$

However, direct implementation of the $u_{small-rev}$ reduced complexity partition function may require two more subtraction operations than the $u_{small}$ reduced complexity partition function. The inner subtraction operation $(f_t-f)$ may be removed by storing inverse cumulative distribution function, $$f_t^{(i)}(j) \triangleq f_t - f_t(j),$$

rather than storing the cumulative distribution function, $f_t(j)$. Because operations such as probability initialization and adaptation can be performed on these inverse cumulative distribution functions just as easily as on the original cumulative distribution functions, storing the inverse cumulative distribution functions may not impose additional computational overhead. Thus, the approximation error of the partitioning may be accumulated by the reduced complexity partition function the based on the inverse cumulative distribution function.

The outer subtraction operation involving R may be removed from the encoder based on the encoder's computing of the size of the new sub-interval as $u(f_t(j+1))-u(f_t(j))$ given the partition function u. Thus, the two outer subtraction operations cancel. Similarly, in the de-coder, the size of the new sub-interval may be formed as the difference between two partition function values, and the outer subtraction operations similarly cancel.

Using the reduced complexity partition function may reduce latency as much as twenty percent and reduce area used as much forty percent compared to using the $U_{ac}$ partition function. Using the reduced complexity partition function may enable hardware encoders and decoders to run at lower clock rates for a given bitrate, consume less power, and extend battery life. Using the reduced complexity partition function may impose a loss of coding accuracy as small as 0.02 percent, much smaller than other approximations.

In some implementations, the accumulation of the approximation error of the partitioning at the first sub-interval may simplify a search loop of a decoder. A decoder may search for a sub-interval containing the number output by the encoder using a search loop. Rather than testing whether or not the search loop has reached the last sub-interval inside the loop, the first sub-interval may be handled as a pre-initialization outside of the loop.

Figure 1B:
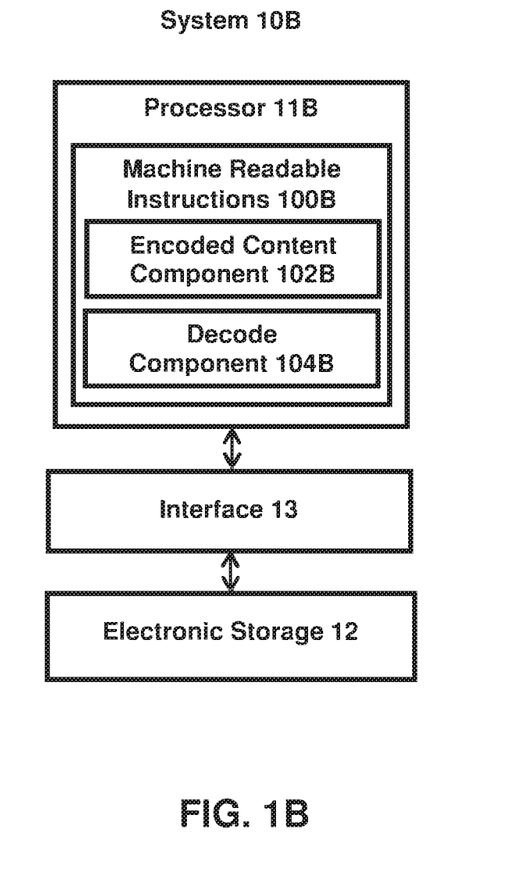
FIG. 1B illustrates an example system that decodes encoded content.

FIG. 1B illustrates a system 10B for decoding content. The system 10B may include one or more of a processor 11B, an electronic storage 12, an interface 13 (e.g., bus, wireless interface), and/or other components. Encoded content may be obtained by the processor 11B. The encoded content may have been encoded from content based on a reduced complexity partition function and an interval. The content may be defined by a sequence of values. The values may be chosen from one or more sets of possible values. Individual values of the set of possible values may have a probability of occurrence in the sequence of values. All of the values of the set of possible values may have a total probability value. The encoded content may be decoded based on the reduced complexity partition function and the interval. The reduced complexity partition function may have an interval size value reduced by a reduction value less than the total probability value. Decoding the encoded content may include partitioning the interval into sub-intervals based on the reduced complexity partition function to identify a given sub-interval corresponding to the content. In some implementations, the system 10B may implement/may be implemented via one or more functions.

The electronic storage 12 may be configured to include electronic storage medium that electronically stores information. The electronic storage 12 may store software algorithms, information determined by the processor 11B, information received remotely, and/or other information that enables the system 10B to function properly. For example, the electronic storage 12 may store information relating to encoded content, values, set of possible values, probabilities of occurrence, reduced complexity entropy coding, interval, sub-interval, reduced complexity partition function, approximation error, and/or other information.

Referring to FIG. 1B, the processor 11B may be configured to provide information processing capabilities in the system 10B. As such, the processor 11B may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11B may be configured to execute one or more machine-readable instructions 100B to facilitate encoding content. The machine-readable instructions 100B may include one or more computer program components. The machine-readable instructions 100B may include one or more of an encoded content component 102B, a decode component 104B, and/or other computer program components.

The encoded content component 102B may be configured to obtain encoded content and/or other information. Obtaining encoded content may include one or more of accessing, acquiring, analyzing, determining, examining, locating, receiving, retrieving, reviewing, and/or otherwise obtaining the encoded content. The encoded content may be encoded by an encoder from content (e.g., image, video) based on a reduced complexity partition function and an interval, such as described above with respect to encode component 104A (shown in FIG. 1A). The content may be defined by a sequence of values, such as described above with respect to system 10 (shown in FIG. 1A). The values may be chosen from one or more sets of possible values. Individual values of the set of possible values may have a probability of occurrence in the sequence of values. All of the values of the set of possible values may have a total probability value. The set of possible values may include a first value and/or other values. In some implementations, the first value may have the highest probability of occurrence.

The encoded content component 102B may obtain encoded content from one or more locations. For example, the encoded content component 102B may obtain the encoded content from a storage location, such as the electronic storage 12, electronic storage of information and/or signals generated by one or more image capture devices, electronic storage of a device accessible via a network, and/or other locations. The encoded content component 102B may obtain the encoded content from one or more hardware components (e.g., an image capture device) and/or one or more software components (e.g., software running on a computing device).

The decode content component 104B may be configured to decode the encoded content based on the reduced complexity partition function, the interval, and/or other information. The interval may match the interval used by the encoder. The reduced complexity partition function may reduce one or more interval size values by a reduction value (a value less than the total probability value), such as described above with respect to reduced complexity entropy coding. The reduction value may include a power of two. The decoding content component 104B may partition the interval into sub-intervals based on the reduced complexity partition function to identify a given sub-interval corresponding to the content. The decode content component 104B may use an output of the encoder (e.g., a bit string written by the encoder) to identify which sub-interval corresponds to the content (the sequence of values) that was encoded. The decode content component 104B may identify the sub-interval containing the C.

A decoder may maintain the value D=(C−L), the difference between the number output by the encoder and the lower end of the current interval, instead of the value L. This may allow the decoder to search for the sub-interval containing C without separately tracking the values of L and C, which saves a subtraction per value decoded. The decoder may store enough bits of D to decide which sub-interval C lies in when partitioning the current interval with the partition function, e.g., at least $b_R$ bits. However, instead of using D=(C−L), a decoder may use D=L+R−1−C. That is, a decoder may store the distance between the top of the current interval and the number output by the encoder, instead of the difference between that number and the bottom of the interval. When updating the interval, the decoder may replace D with:

$$D' = D - R + u_{small-rev}(f_i(j)) + u_{small-rev}(f_i(j+1)) - u_{small-rev}(f_i(j))$$

$$= D - (R - u_{small-rev}(f_i(j+1)))$$

$$= D - \left\lfloor \frac{f_i^{(i)}(j+1) \left\lfloor \frac{R}{2^g} \right\rfloor}{\frac{f_t}{2^g}} \right\rfloor.$$

When the decoder examines additional bits of C during renormalization, the decoder may shift in one bits instead of zero bits when rescaling the current value of D using a left-shift operation. The decoder may update the difference for the additional bits of C by simply exclusive-OR-ing them with the appropriate bits of D. This operation may avoid the latency of a full subtraction operation, and may limit the number of bits of C which must be examined to compute the difference to the same number that was previously required to compute C−L.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 11A, 11B and electronic storage 12A, 12B are shown to be connected to interface 13 in FIG. 1, any communication medium may be used to facilitate interaction between any components of system 10A, 10B. One or more components of system 10A, 10B may communicate with each other through hard-wired communication, wireless communication, or both. For example, one or more components of system 10A, 10B may communicate with each other through a network. For example, processor 11A, 11B may wirelessly communicate with electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11A, 11B is shown in FIGS. 1A, 1B as a single entity, this is for illustrative purposes only. In some implementations, the processor 11A, 11B may comprise a plurality of processing units. These processing units may be physically located within the same device, or the processor 11A, 11B may represent processing functionality of a plurality of devices operating in coordination. The processor 11A, 11B may be configured to execute one or more components by software; hardware; firmware; some combination of software, hardware, and/or firmware; and/or other mechanisms for configuring processing capabilities on the processor 11A, 11B.

It should be appreciated that although computer components are illustrated in FIGS. 1A-1B as being co-located within a single processing unit, in implementations in which the processor 11A, 11B comprises multiple processing units, one or more of computer program components may be located remotely from the other computer program components.

While the computer program components are described herein as being implemented via processor 11A, 11B through machine-readable instructions 100A, 100B, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, the processor 11A, 11B may be configured to execute one or more additional computer program components that may perform some or all of the functionality attributed to one or more of computer program components described herein.

In some implementations, some or all of the functionalities of the computer program components/systems describes herein may be provided by one or more external resources. External sources may include hosts/sources of information, computing, and/or processing and/or other providers of information, computing, and/or processing outside of the system 10A, 10B.

The electronic storage media of the electronic storage 12 may be provided integrally (i.e., substantially non-removable) with one or more components of the system 10A, 10B and/or removable storage that is connectable to one or more components of the system 10A, 10B via, for example, a port (e.g., a USB port, a Firewire port, etc.) or a drive (e.g., a disk drive, etc.). The electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 12 may be a separate component within the system 10A, 10B, or the electronic storage 12 may be provided integrally with one or more other components of the system 10A, 10B (e.g., the processor 11A, 11B). Although the electronic storage 12 is shown in FIGS. 1A-1B as a single entity, this is for illustrative purposes only. In some implementations, the electronic storage 12 may comprise a plurality of storage units. These storage units may be physically located within the same device, or the electronic storage 12 may represent storage functionality of a plurality of devices operating in coordination.

Figure 2A:
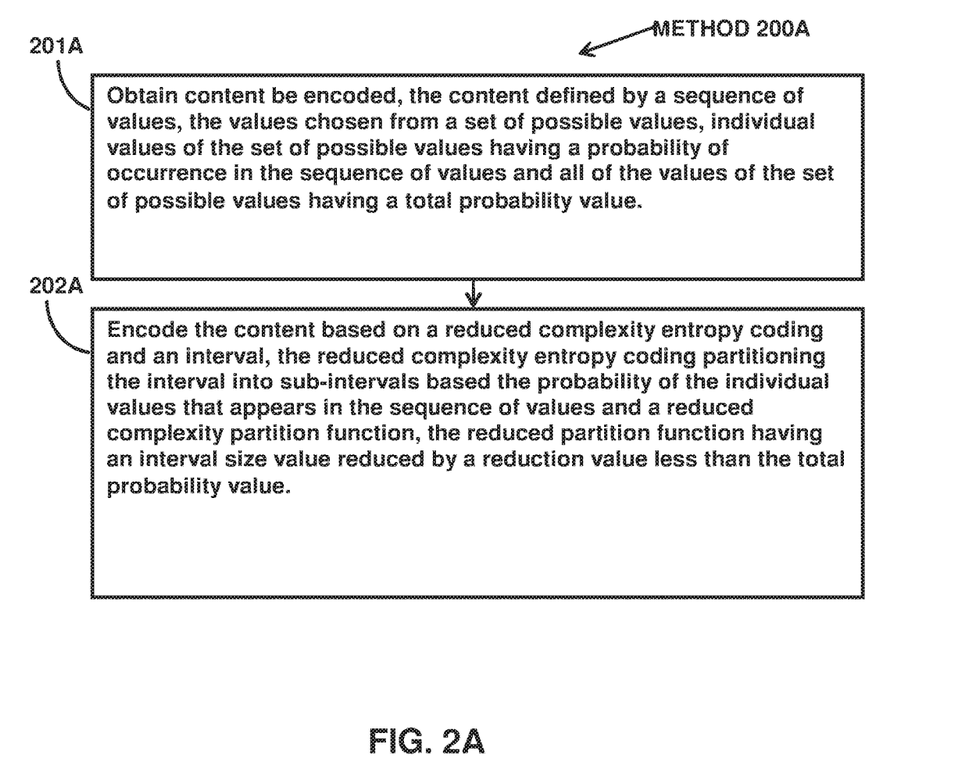
FIG. 2A illustrates an example method for encoding content.

FIG. 2A illustrates method 200A for encoding content. The operations of method 200A presented below are intended to be illustrative. In some implementations, method 200A may be accomplished with one or more additional operations not described, and/or without one or more of the operations discussed. In some implementations, two or more of the operations may occur substantially simultaneously.

Referring to FIG. 2A and method 200A, at operation 201A, content to be encoded may be obtained. The content may be defined by a sequence of values and/or other information. The values may be chosen from one or more sets of possible values. Individual values of the set of possible values may have a probability of occurrence in the sequence of values. All of the values of the set of possible values may have a total probability value. In some implementation, operation 201A may be performed by a processor component the same as or similar to the content component 102A (Shown in FIG. 1A and described herein).

At operation 202A, the content may be encoded based on a reduced complexity entropy coding, an interval, and/or other information. The reduced complexity entropy coding may partition the interval into sub-intervals based the probability of the individual values that appears in the sequence of values, a reduced complexity partition function, and/or other information. The reduced complexity partition function may have an interval size value reduced by a reduction value less than the total probability value. In some implementations, operation 202A may be performed by a processor component the same as or similar to the encode component 104A (Shown in FIG. 1A and described herein).

Figure 2B:
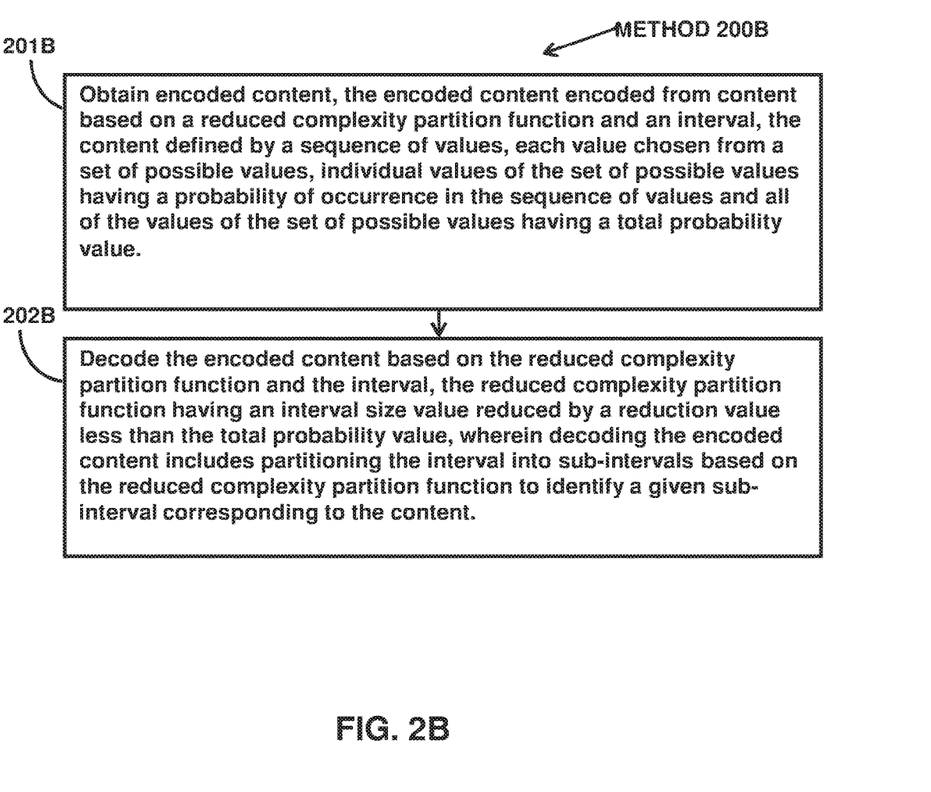
FIG. 2B illustrates an example method for decoding encoded content.

FIG. 2B illustrates method 200B for decoding encoded content. The operations of method 200B presented below are intended to be illustrative. In some implementations, method 200B may be accomplished with one or more additional operations not described, and/or without one or more of the operations discussed. In some implementations, two or more of the operations may occur substantially simultaneously.

Referring to FIG. 2B and method 200B, at operation 201B, encoded content may be obtained. The encoded content may be encoded from content based on a reduced complexity partition function and an interval. The content may be defined by a sequence of values. The values may be chosen from one or more sets of possible values. Individual values of the set of possible values may have a probability of occurrence in the sequence of values. All of the values of the set of possible values may having a total probability value. In some implementation, operation 201B may be performed by a processor component the same as or similar to the encoded content component 102B (Shown in FIG. 1B and described herein).

At operation 202B, the encoded content may be decoded based on the reduced complexity partition function and the interval. The reduced complexity partition function may have an interval size value reduced by a reduction value less than the total probability value. Decoding the encoded content may include partitioning the interval into sub-intervals based on the reduced complexity partition function to identify a given sub-interval corresponding to the content. In some implementations, operation 202B may be performed by a processor component the same as or similar to the decode component 104B (Shown in FIG. 1B and described herein).

In some implementations, method 200A, 200B may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200A, 200B in response to instructions stored electronically on one or more electronic storage mediums. The one or more processing devices may include one or more devices configured through hardware, firmware, and/or software to be specifically designed for execution of one or more of the operation of method 200A and/or 200B.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that encodes content, the system comprising:
one or more physical processors configured by machine-readable instructions to:
obtain content to be encoded, the content defined by a sequence of values, each value chosen from a set of possible values, wherein the set of possible values is arranged in an ordered sequence, and a first value appears first in the ordered sequence, the first value having a value of zero, individual values of the set of possible values having a probability of occurrence in the sequence of values and all of the values of the set of possible values having a total probability value; and
encode the content based on a reduced complexity entropy coding and an interval, the reduced complexity entropy coding partitioning the interval into sub-intervals based on the probabilities of the individual values of the set of possible values that appear in the sequence of values and a reduced complexity partition function, the reduced complexity partition function having an interval size value reduced by a reduction value less than the total probability value and accumulating an approximation error of the partitioning at a first sub-interval of the sub-intervals, wherein the accumulation of the approximation error of the partitioning at the first sub-interval simplifies a search loop of a decoder.

2. The system of claim 1, wherein first sub-interval corresponds to the first value.

3. The system of claim 2, wherein the approximation error of the partitioning is accumulated based on an inverse cumulative distribution function.

4. The system of claim 1, wherein the reduction value includes a power of two.

5. The system of claim 1, wherein the content to be encoded includes an image or a video.

6. The system of claim 1, wherein the values of the sequence of values are chosen from multiple sets of possible values.

7. A system that decodes encoded content, the system comprising:
one or more physical processors configured by machine-readable instructions to:
obtain the encoded content, the encoded content encoded from content based on a reduced complexity partition function and an interval, the content defined by a sequence of values, each value chosen from a set of possible values, wherein the set of possible values is arranged in an ordered sequence, and a first value appears first in the ordered sequence, the first value having a value of zero, individual values of the set of possible values having a probability of occurrence in the sequence of values and all of the values of the set of possible values having a total probability value; and
decode the encoded content based on the reduced complexity partition function and the interval, the reduced complexity partition function having an interval size value reduced by a reduction value less than the total probability value, wherein decoding the encoded content includes partitioning the interval into sub-intervals based on the reduced complexity partition function to identify a given sub-interval corresponding to the content, a first sub-interval of the sub-intervals including an approximation error of the partitioning, wherein the accumulation of the approximation error of the partitioning at the first sub-interval simplifies a search loop of a decoder.

8. The system of claim 7, wherein the first sub-interval corresponds to the first value.

9. The system of claim 8, wherein the approximation error of the partitioning is accumulated based on an inverse cumulative distribution function.

10. The system of claim 7, wherein the reduction value includes a power of two.

11. The system of claim 7, wherein the content includes an image or a video.

12. The system of claim 7, wherein the values of the sequence of values are chosen from multiple sets of possible values.

13. The system of claim 7, wherein the one or more processors are further configured to store a distance between a top of the interval and a number output by an encoder.

14. A method of encoding content, the method comprising:
obtaining content to be encoded, the content defined by a sequence of values, each value chosen from a set of possible values, wherein the set of possible values is arranged in an ordered sequence, and a first value appears first in the ordered sequence, the first value having a value of zero, individual values of the set of possible values having a probability of occurrence in the sequence of values and all of the values of the set of possible values having a total probability value; and
encoding the content based on a reduced complexity entropy coding and an interval, the reduced complexity entropy coding partitioning the interval into sub-intervals based on the probabilities of the individual values of the set of possible values that appear in the sequence of values and a reduced complexity partition function, the reduced complexity partition function having an interval size value reduced by a reduction value less than the total probability value and accumulating an approximation error of the partitioning at a first sub-interval of the sub-intervals, wherein the accumulation of the approximation error of the partitioning at the first sub-interval simplifies a search loop of a decoder.

15. A method of decoding encoded content, the method comprising:
obtaining the encoded content, the encoded content encoded from content based on a reduced complexity partition function and an interval, the content defined by a sequence of values, each value chosen from a set of possible values, wherein the set of possible values is arranged in an ordered sequence, and a first value appears first in the ordered sequence, the first value having a value of zero, individual values of the set of possible values having a probability of occurrence in the sequence of values and all of the values of the set of possible values having a total probability value; and decoding the encoded content based on the reduced complexity partition function and the interval, the reduced complexity partition function having an interval size value reduced by a reduction value less than the total probability value, wherein decoding the encoded content includes partitioning the interval into sub-intervals based on the reduced complexity partition function to identify a given sub-interval corresponding to the content, a first sub-interval of the sub-intervals including an approximation error of the partitioning, wherein the accumulation of the approximation error of the partitioning at the first sub-interval simplifies a search loop of a decoder.

* * * * *